D. W. SIMMONS.
AUTOMOBILE LOCK.
APPLICATION FILED SEPT. 19, 1921.
1,435,560.
Patented Nov. 14, 1922.
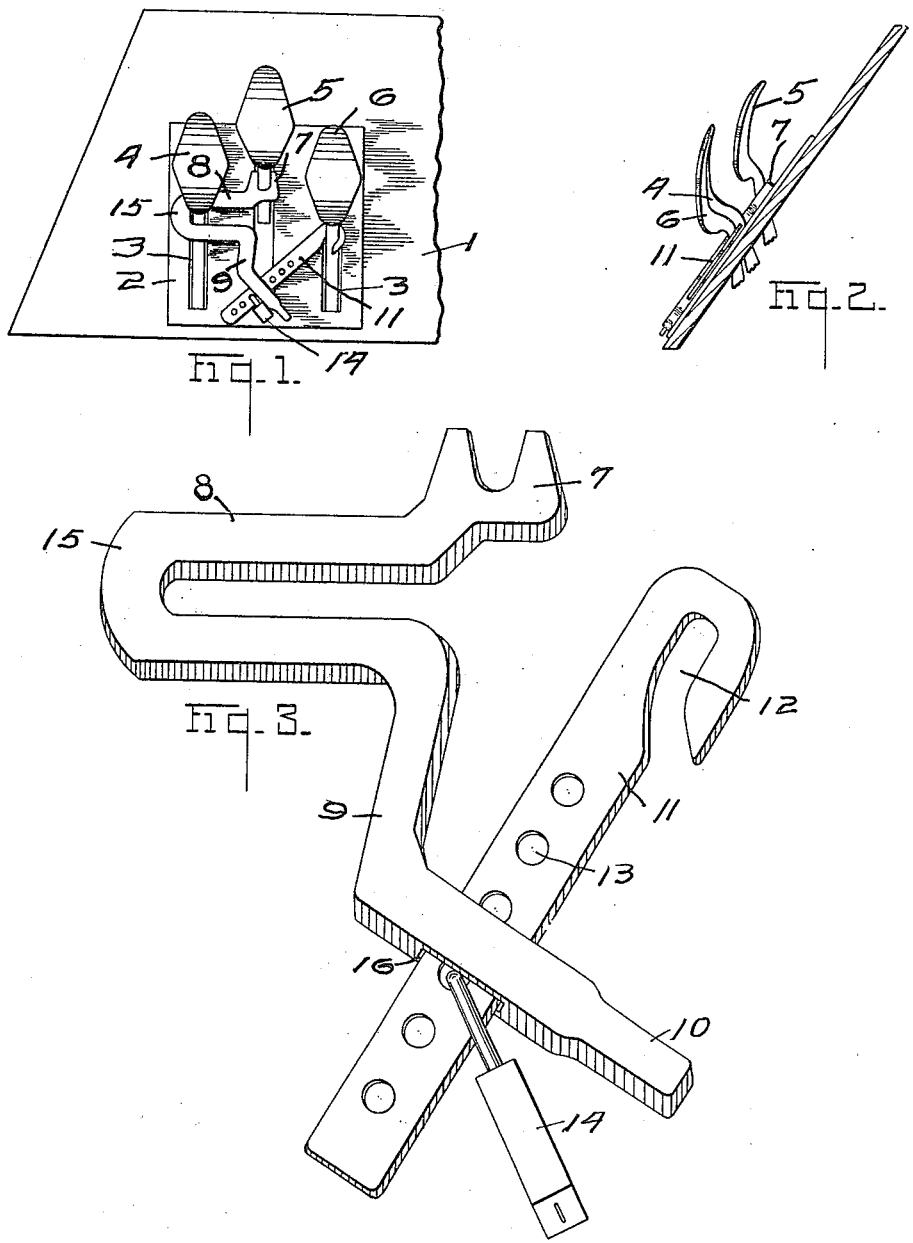
INVENTOR
Dale W. Simmons
by
Owen Owen Crampton Patented Nov. 14, 1922.

1,435,560

UNITED STATES PATENT OFFICE.

DALE W. SIMMONS, OF BOWLING GREEN, OHIO.

AUTOMOBILE LOCK.

Application filed September 19, 1921. Serial No. 501,777.

*To all whom it may concern:*

Be it known that I, DALE W. SIMMONS, a citizen of the United States, and a resident of Bowling Green, in the county of Wood and State of Ohio, have made an invention appertaining to Automobile Locks; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide an efficient automobile lock that may be readily positioned on the pedals of an automobile, particularly a Ford, so as to lock the pedals together and to cause the reverse pedal and the speed regulator pedal to engage and thus to set one pedal against the other and prevent the car from being started or towed away.

Constructions containing the invention may in their details partake of different forms, and to illustrate a practical application of the invention I have selected a structure containing the invention and shall describe it hereinafter. The structure selected is illustrated in the accompanying drawings.

Figure 1 of the drawings is a top view of the pedals and the locking means in position. Fig. 2 is a side view of the pedals and of the locking device. Fig. 3 is a perspective view of the locking device.

1 is the footboard having the pedal plates 2. The pedal plates are provided with slots 3 through which the pedals extend. 4 is the forward pedal and arm forming a part thereof that is used for shifting the mechanism into high or low speed. 5 is the reverse pedal and the arm forming a part thereof for causing the car to move backwards, and 6 is the brake pedal and the arm forming a part thereof, as well known in connection with Ford automobiles.

The locking device is formed of a bent bar of iron having a forked end 7 and a U-shaped portion 8 and a laterally and angularly extending part 9 which may be provided with a handle 10 and a hook bar 11 having a hook 12 and holes 13 through which the lock 14 may be inserted when the bar 11 is placed in engaging relation to the bar 15. The forked end 7 is located at the end of one of the legs of the U-portion and the angularly shaped portion 9 extends from the end of the other leg of the U. The portion 9 is formed of two parts, one of which extends from the U-portion 8 and a part that extends at right angles to the hook bar 11, whereby the handle 10 is located somewhat remote from the end of the U-portion and the forked end 7 so that the pedals 4 and 5 may be pushed apart by a lever motion of the bar and with considerable pressure. The bar 15 is slipped over the lever or arm supporting the pedal 4, the legs of the U-portion 8 being placed at a distance from each other about the width of the lever or arm supporting the pedal 4. When the bar 15 is placed in position such that the pedal arm of the pedal 4 is located at the inner end of the U-shaped portion the bar 15 may be turned about the arm supporting the pedal 4 to cause the forked end 7 to engage the arm of the pedal 5. If then the lever operating the brake of the Ford automobile is released the pedals 4 and 5 will be set against one another by a reverse pivotal movement of the lever 15 which will pivot on the arm supporting the pedal 4 and push the pedal 5 down and pull the pedal 4 up. This position may be secured and maintained by means of the hook bar 11 which may be hooked over the lever that supports the brake pedal 6, and the bar 15 may be held in the position in which it is placed to set the pedals 4 and 5 against one another by means of the padlock 14 that may be inserted through the opening nearest the bar 15 and on the side opposite to that on which the pedal 6 is located. The bar 11 may extend through a slot 16 formed in the bar 15 so that the bar 11 may slide through the bar 15 except when it is locked by the padlock 14. The hook 12 is of sufficient length to prevent the hook from being disengaged from the arm supporting the pedal 6.

The pedals will thus be locked in their positions and movements from such positions will be prevented until the padlock 14 is unlocked. The arms supporing the pedals, as is well known, are tapered and the sizes of the part 8 of the bar 15 and the hook 12 are such that even if the boards 1 are removed the bar 15 and the bar 11 can not be pushed down along the pedal arms.

I claim:

1. In an automobile locking means, a bar having a forked end for locking one pedal down, and a U-shaped portion for locking another pedal up, a hook bar for drawing the first named bar towards the hooked end and for locking a third pedal up, means for interlocking the bars.

2. In an automobile pedal locking means, a bar having a forked end for locking the reversed pedal down, a U-shaped portion for locking the forward speed pedal up, and a hook bar extending through the first named bar for locking the brake pedal up, and means for interlocking the two bars together.

3. In an automobile pedal locking means, a bar extending around one pedal and engaging a second pedal by pivotal movements about the first pedal and forming a lever for forcing the pedals in opposite directions, and means for locking the bar in the various positions that it may take in its pivotal movements.

In testimony whereof, I have hereunto signed my name to this specification.

DALE W. SIMMONS.